Nov. 8, 1932.  C. B. LARSON  1,886,699
UNIVERSAL AUTOMATIC GRINDER, POLISHER, OR BUFFER
Filed Feb. 2, 1931  5 Sheets-Sheet 1

INVENTOR.
Carl B. Larson,
BY
George D. Richards
ATTORNEY.

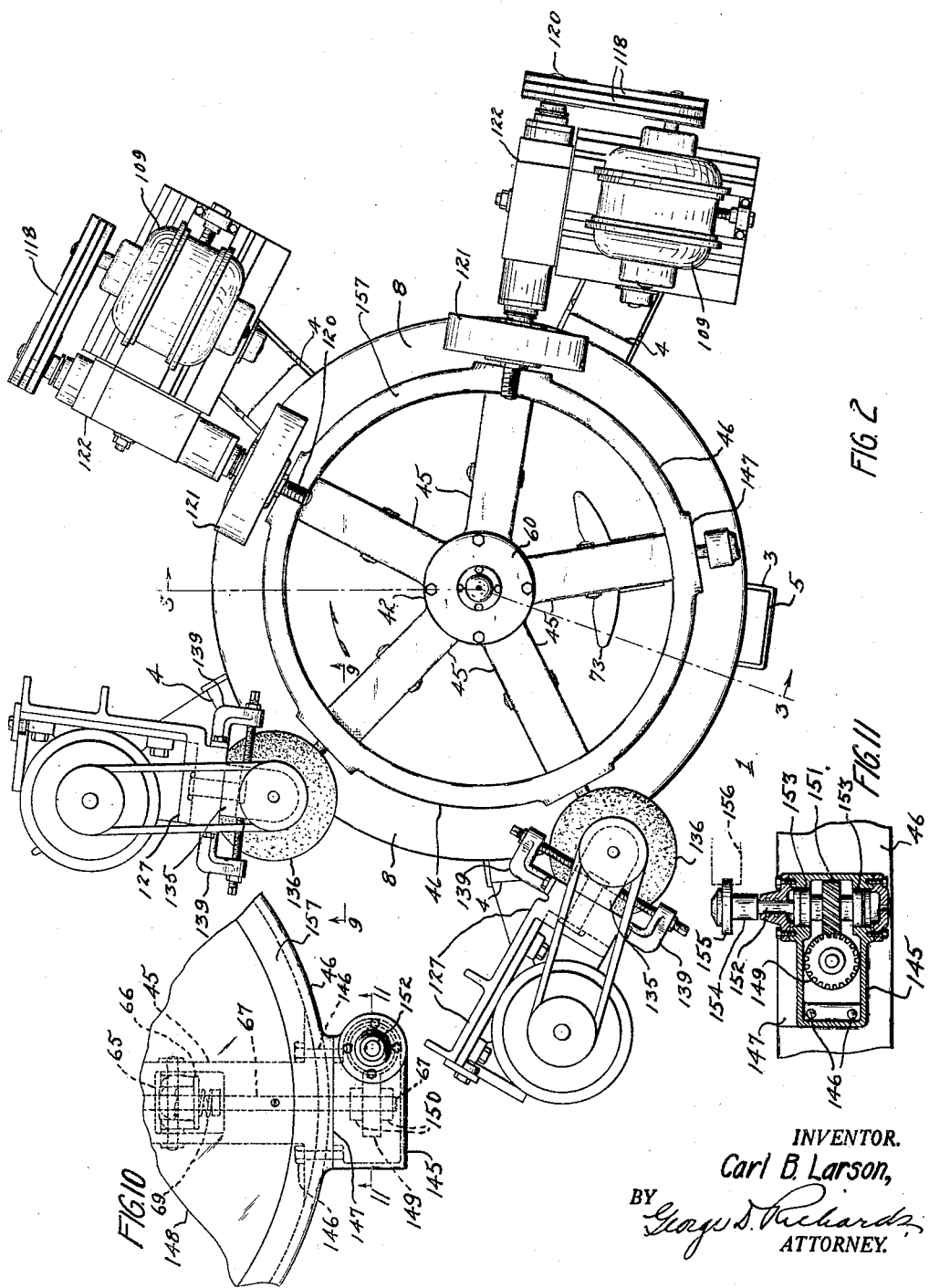

Nov. 8, 1932.    C. B. LARSON    1,886,699
UNIVERSAL AUTOMATIC GRINDER, POLISHER, OR BUFFER
Filed Feb. 2, 1931    5 Sheets-Sheet 3
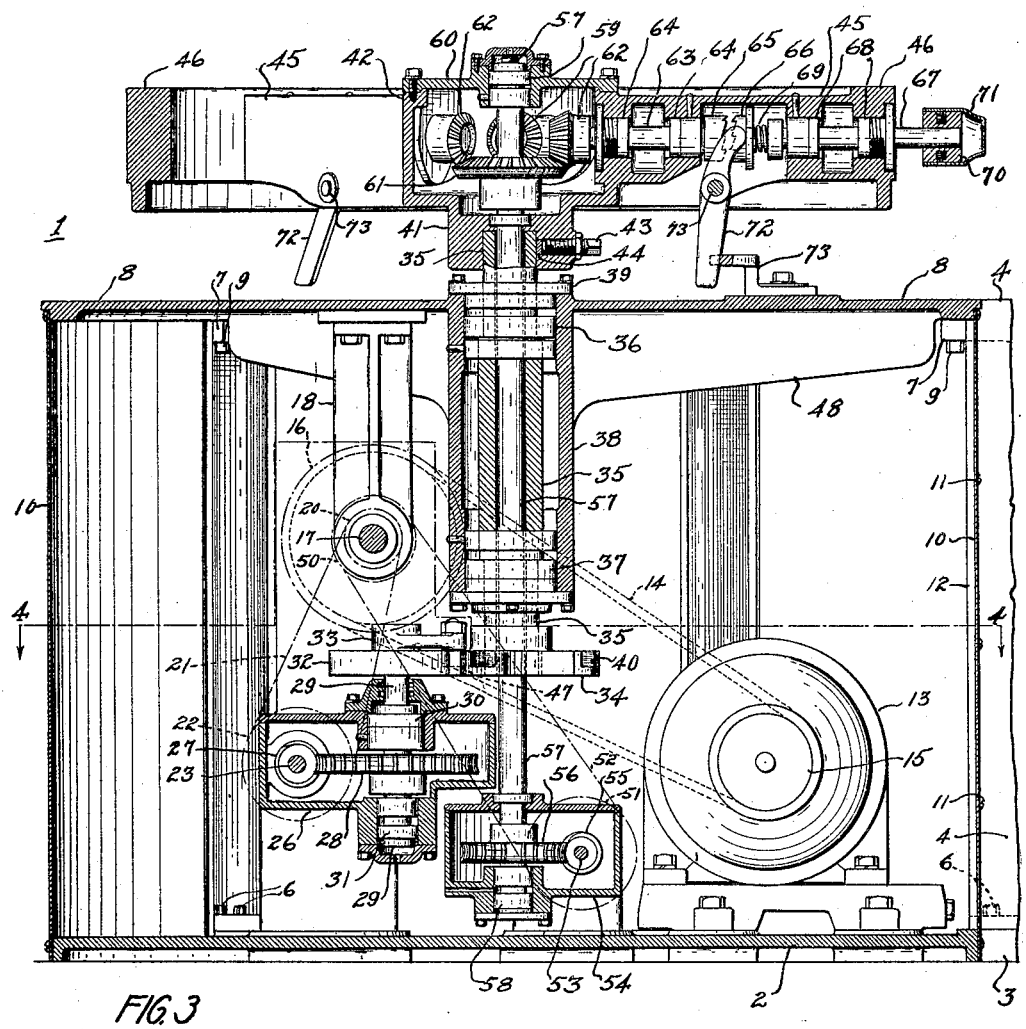
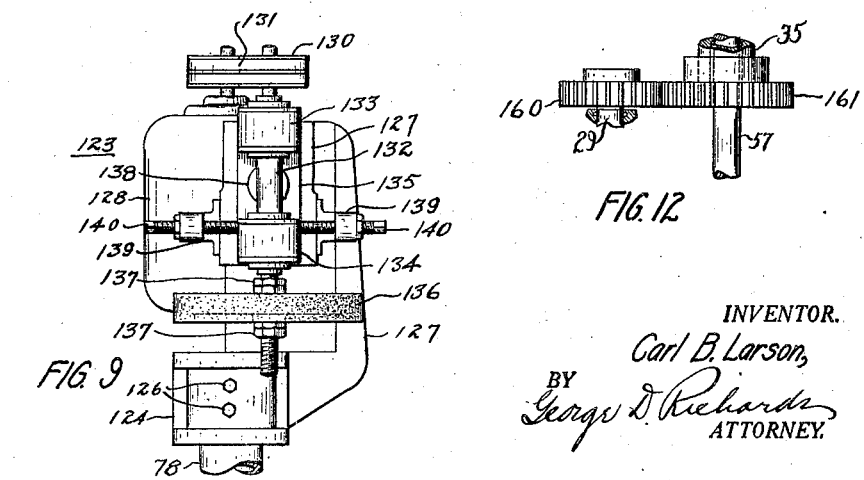
INVENTOR.
Carl B. Larson,
BY George D. Richards
ATTORNEY.

Nov. 8, 1932.  C. B. LARSON  1,886,699
UNIVERSAL AUTOMATIC GRINDER, POLISHER, OR BUFFER
Filed Feb. 2, 1931  5 Sheets-Sheet 4
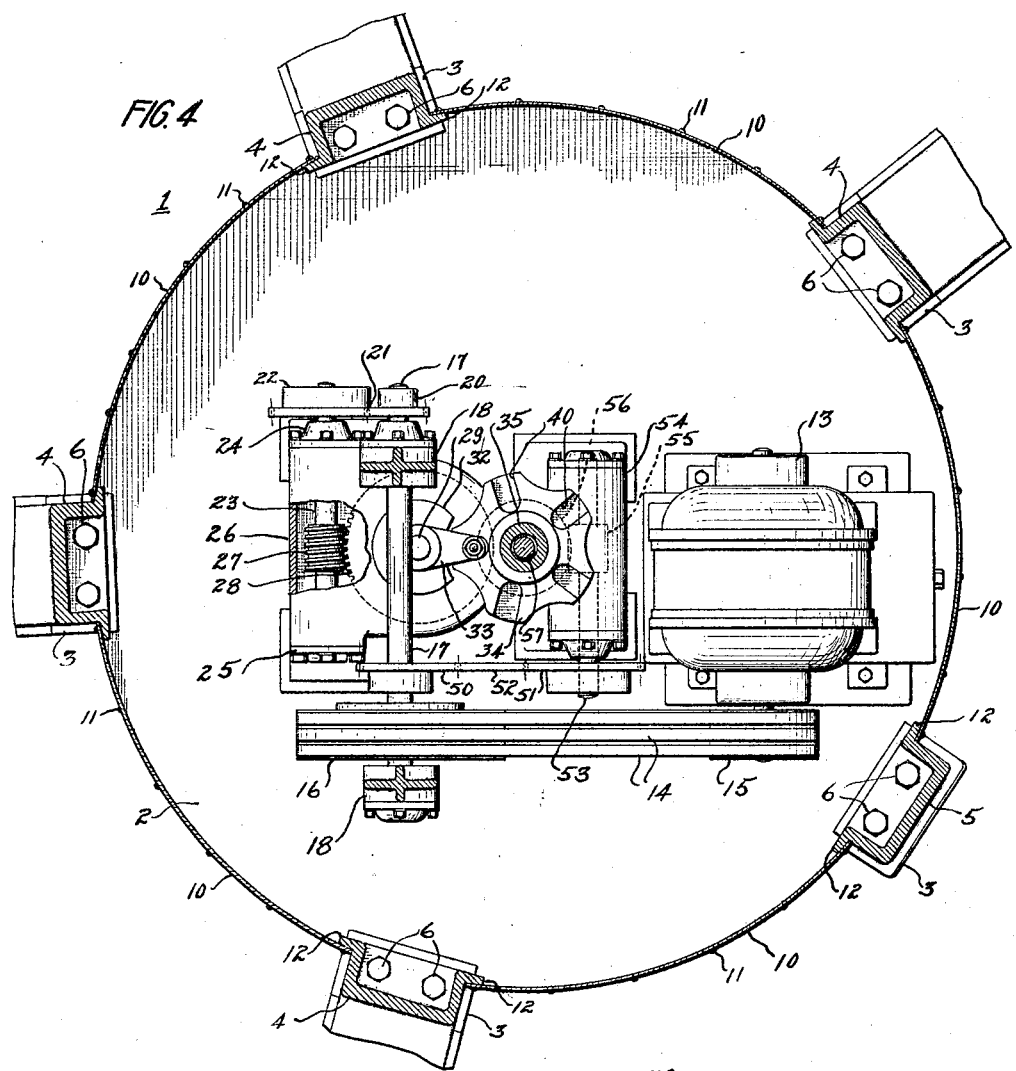
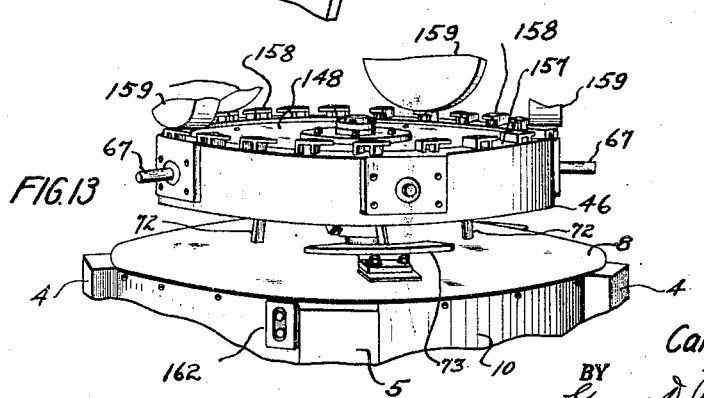
INVENTOR.
Carl B. Larson,
BY
George D. Richards
ATTORNEY.

Nov. 8, 1932.  C. B. LARSON  1,886,699
UNIVERSAL AUTOMATIC GRINDER, POLISHER, OR BUFFER
Filed Feb. 2, 1931  5 Sheets-Sheet 5
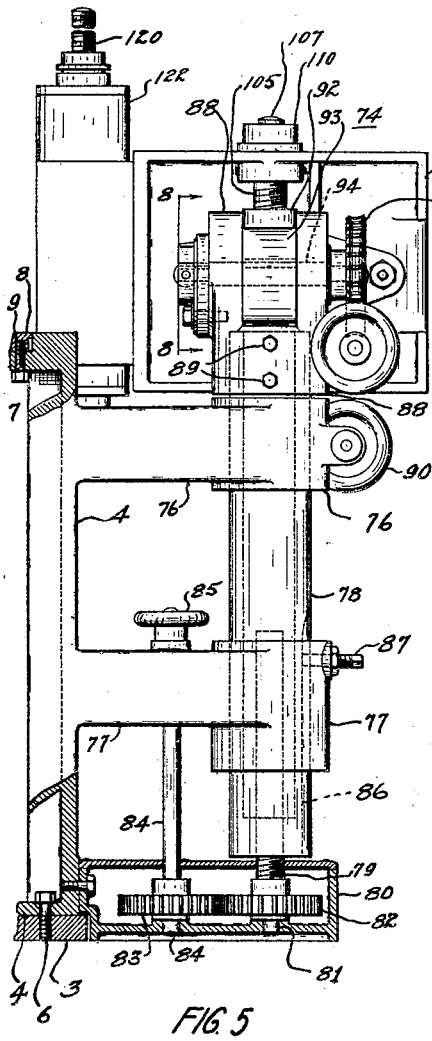
INVENTOR.
Carl B. Larson,
BY George D. Richards
ATTORNEY.

Patented Nov. 8, 1932

1,886,699

UNITED STATES PATENT OFFICE

CARL B. LARSON, OF MAPLEWOOD, NEW JERSEY, ASSIGNOR TO WILLIAM C. HAMMOND, OF KALAMAZOO, MICHIGAN

UNIVERSAL AUTOMATIC GRINDER, POLISHER OR BUFFER

Application filed February 2, 1931. Serial No. 512,785.

This invention relates, generally to the grinding, polishing or buffing of objects; and the invention has reference, more particularly, to a novel universal machine for performing any one or all of these operations.

Grinding, polishing or buffing machines as heretofore generally constructed are not entirely satisfactory in use owing to the impossibility of adapting such machines for handling various kinds or classes of work. Any one of these machines is commonly adapted to handle only a certain class of work, and the use of such machines generally requires the expenditure of considerable manual effort owing to the necessity of frequently handling the work while it is being worked on by the machine. These machines are frequently of limited capacity in that they turn out the work slowly, thereby increasing the unit cost which is further increased by the excessive labor costs.

The principal object of the present machine is to provide a novel grinding, polishing or buffing machine which is so constructed and arranged as to be universal in its adaptability to handle various classes or kinds of work and which is substantially automatic in operation, the same being capable of performing a plurality of operations with but a single application of the work to the machine.

Another object of the present invention lies in the provision of a novel grinding, polishing or buffing machine which may easily and quickly adjusted to handle any work desired, regardless of the type of work the machine was previously set up to handle.

A third object of the present invention is to provide a novel grinding, polishing or buffing machine having a revolvable work carrying spider which is driven with an intermittent action and which may be operated at any one of a plurality of speeds so that the period of dwell or stopping of the spider may be varied, depending upon the nature of the work or objects handled, the said work carrying spider having rotatable work supporting shafts adapted for revolving the work operated upon as the same is temporarily held or retarded while under an operating wheel, whereby a maximum area of the work or object is ground, polished or buffed without the production of scratches or disfiguring marks or serrations and in a minimum of time, the said work shafts being rotatable at that one of a plurality of speeds which is best suited for the particular work handled.

Another object of the present invention lies in the provision of a grinding, polishing or buffing machine having novel operating wheel supporting heads adapted to universally support the operating wheels, whereby said wheels may be caused to conform to the surfaces of the objects or work treated, irrespective of the shape of such objects, while at the same time enabling motion of the active surfaces of said operating wheels along lines which are other than parallel to the lines of motion of the surfaces of the objects operated upon.

A fifth object of the present invention is to provide a novel grinding, polishing or buffing machine having its operative parts completely housed so as to prevent the access of injurious foreign matter thereinto, thereby adapting the machine for use by unskilled workmen.

Still another object of the present invention lies in the provision of a grinding, polishing or buffing machine which is of rugged, compact design, and which is adapted to handle the work without jolting or jarring so that neat and accurate work is turned out with a minimum of driving effort.

Other objects of this invention, not at this time more particularly enumerated, will be clearly understood from the following detailed description of the same.

The invention is clearly illustrated in the accompanying drawings in which:—

Fig. 2 is a plan view of the machine shown in Fig. 1;

Fig. 3 is a sectional view with parts broken away or omitted, taken substantially along line 3—3 of Fig. 2;

Fig. 4 is a sectional view with parts broken away, taken along line 4—4 of Fig. 3;

Fig. 5 is a view in elevation with parts broken away of a polishing or buffing operating wheel supporting head;

Fig. 6 is a fragmentary view looking at the right side of the structure shown in Fig. 5;

Fig. 7 is a sectional view taken along line 7—7 of Fig. 6;

Fig. 8 is a fragmentary view taken along line 8—8 of Fig. 5;

Fig. 9 is an enlarged view in elevation of a grinding operating wheel head looking in the direction of the arrows 9—9 in Fig. 2;

Fig. 10 is a fragmentary plan view showing a vertical shaft fixture attached to the machine spider or bed;

Fig. 11 is a sectional view taken along line 11—11 of Fig. 10 looking in the direction of the arrows, and shows work carried by the vertical shaft fixture;

Fig. 12 is a fragmentary view showing gearing adapted to be substituted for the Geneva gearing used in the machine when performing certain work; and Fig. 13 is a fragmentary perspective view illustrating the use of the machine of this invention for polishing flat surfaces.

Similar characters of reference are employed in all of the above described views to indicate corresponding parts.

Figure 1:
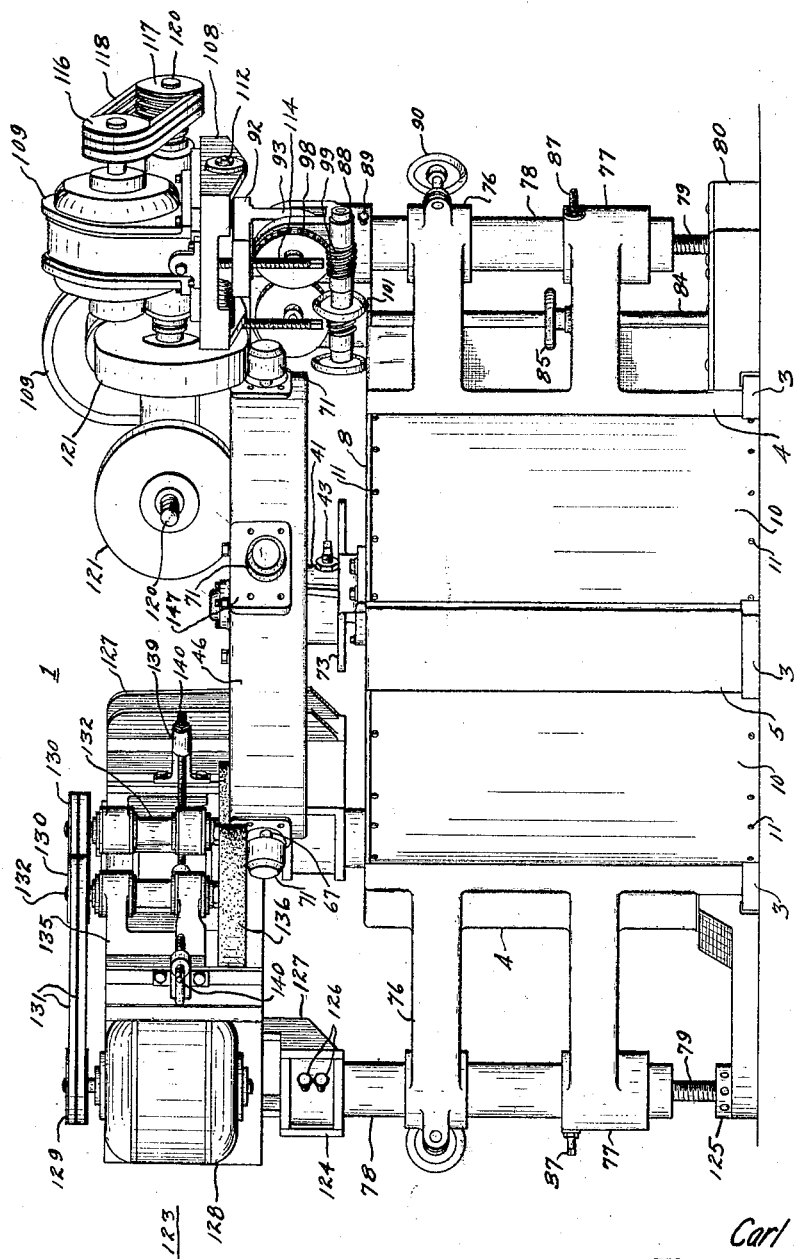
Fig. 1 is a view in elevation of the novel machine of this invention and illustrates the machine set up for grinding and polishing objects in a single operation.

Referring now to said drawings, the reference numeral 1 designates the novel machine of this invention as a whole. Machine 1 comprises a circular base 2 having angularly spaced footings 3, projecting radially outwardly from the periphery of base 2 for supporting a plurality of operating head uprights or pedestals 4 and a strut 5. Each of the operating head pedestals is adapted to support an operating wheel such as a grinding, polishing or buffing wheel in a manner to be described. Base 2 is illustrated as provided with five of the footings 3 which are spaced from one another at equal angular distances about this base as measured with respect to the vertical axis of this base. It is to be understood, that a greater or lesser number of these footings may be used depending upon the number of operating head pedestals 4 it is desired to mount on the base 2. Machines of larger sizes, i. e. larger base diameter, would ordinarily be provided with a greater number of footings 3 and a corresponding greater number of the operating head pedestals 4. Ordinarily only a single strut 5 is provided, the positioning of which strut determines the point at which the machine operator is located.

Operating head pedestals 4 and strut 5 are secured to the footings 3 as by screws 6. The pedestals 4 and the strut 5 are provided near their upper ends with radial, inwardly directed lugs 7 for supporting a circular cover or table 8 of the machine 1. Table 8 is secured to the supporting lugs 7 as by screws 9. The sides of the machine 1, extending between the base 2 and cover 8, are closed by arcuate sheet metal sections 10 which are secured at their upper ends to the table 8 and at their lower ends to the base 2 as by screws 11. The side edges of the arcuate sheet metal sections 10 are secured as by screws 11 to flanges 12 formed at the sides of the pedestals 4 and the strut 5. The sheet metal sections 10 in combination with the pedestals 4 and strut 5, serve to completely enclose the sides of the casing portion of machine 1, whereas the base 2 and the table 8 serve to complete the closure so that the mechanism contained within the interior of the machine casing is completely housed and protected from entrance of extraneous harmful matter.

A motor 13 is contained within the casing of machine 1, which motor drivingly connected as by a multiple belt drive 14 and pulleys 15 and 16 to a counter-shaft 17 which is rotatably supported in hangers 18 depending from the underside of table 8. Counter-shaft 17 extends through and beyond one of the hangers 18 and has a driving sprocket 20 fixed thereon. A sprocket chain 21 is driven by the driving sprocket 20 and this chain in turn drives a sprocket 22 which is fixed upon the overhanging end of a worm shaft 23 mounted in bearings 24 and 25 of a gear housing 26. Worm shaft 23 has a worm 27 keyed thereon which meshes with a worm wheel 28 also contained within the housing 26. Worm wheel 28 is keyed upon a vertically extending shaft 29 which is suitably mounted in anti-friction bearings 30 and 31 within the housing 26. Shaft 29 projects upwardly from the housing and has a Geneva lock disk 32 and a Geneva arm 33 keyed upon its upper end portion for cooperating with a Geneva wheel 34 which is keyed upon the lower end of a vertically extending hollow spindle 35. The Geneva arm 33 carries a roller 47 which is adapted to work in radial operating slots provided in the Geneva wheel 34. The Geneva wheel 34 is provided with five operating slots 40 which are respectively positioned at equal angular distances from one another about the Geneva wheel.

Spindle 35 is rotatably supported in anti-friction bearings 36 and 37 which are housed within a depending tubular projection 38 formed at the center of the table 8. Table 8 is illustrated as provided with a plurality of stiffening ribs 48 on its inner surface, which ribs extend from the tubular projection 38 toward the periphery of the tube. Spindle 35 extends through the tubular projection 38, through an aperture provided in a cover plate 39 mounted on the upper end of this tubular projection and into a conforming recess provided in the hub 41 of a spider or bed member 42. The hub 41 of spider 42 is adjustably secured on spindle 35 at any desired angular position with respect to the axis of this spindle by the action of a set screw 43 threaded through the hub 41 and pressing a shoe 44 against the surface of spindle 35. The shoe 44 is preferably made of softer metal or alloy than the spindle 35 so that the same will not scar the spindle when the screw 43 is jammed thereagainst. Spider 42 is formed with five similar radiating arms 45 which arms are equally spaced angularly with respect to one another about the axis of spindle 35. The outer ends of the arms 45 are preferably integrally connected within an annular flange 46 disposed above the table 8 and arranged concentrically with respect to the axis of spindle 35.

Since the Geneva wheel 34 has five radial slots 40, the spindle 35 will make one fifth of a revolution for every revolution of the shaft 29. Hence, when the shaft 29 makes one revolution, the spider 42 will be rotated through a fifth of a revolution and will be caused to dwell for a time at the end of each fifth of a revolution, the time of dwell depending upon the rotational speed of the shaft 29. By changing the relative sizes of sprockets 20 and 22, the speed of the worm shaft 23 may be varied, thereby causing speed of shaft 29 to be correspondingly varied so that the period of dwell of the spider 42 will likewise be varied.

Counter-shaft 17 has a sprocket 50 keyed thereon, which sprocket is adapted to drive another sprocket 51 by means of a sprocket chain 52. Sprocket 51 is keyed upon the overhanging end of a worm shaft 53 which is rotatably mounted in bearings provided in a housing 54. Worm shaft 53 has a worm 55 keyed thereon, which worm meshes with a worm wheel 56 contained within housing 54 and fixed upon a vertically extending shaft 57. Shaft 57 has its lower end rotatably supported in an anti-friction bearing 58 provided in the lower portion of housing 54, and this shaft extends upwardly through the hollow spindle 35 and has its upper end rotatably mounted in an anti-friction bearing 59 provided in a top plate 60 attached to the spider 42.

A bevel gear 61 is keyed upon the upper portion of shaft 57 and is housed within the hollow interior of spider 42 in overlying relation to the hub 41 of this spider as especially shown in Fig. 3. Bevel gear 61 meshes with five smaller bevel gears 62 which are respectively keyed upon the inner ends of five radially extending shafts 63, each of which shafts is enclosed within the interior of one of the arms 45. Shafts 63 are supported in anti-friction bearings 64 mounted within the hollow interiors of the arms 45. Shafts 63 have clutch elements 65 secured upon their outer ends, which clutch elements are adapted to be engaged by axial movable clutch elements 66 splined upon work shafts 67, which shafts are axially aligned with the shafts 63 and are rotatably mounted in anti-friction bearings 68 carried by the spider 42. The outer end portions of work shafts 67 project beyond the flange 46 and are splined for receiving the work holders 70 which are adapted to hold work such as the hub caps 71. Work holders 70 are adapted to revolve the work 71 about a horizontal axis.

To provide for revolving the work about a vertical axis, when desired, a vertical shaft fixture is employed (see Figs. 10 and 11). This vertical shaft fixture comprises a casing 145 which is adapted to be secured, as by screws 146, to flattened surfaces 147 provided on the annular flange 46 of the spider or bed 42. In Fig. 10 the radial arms 45 of the spider 42 are illustrated as covered by a disc shaped plate 148 which serves to prevent dust or other foreign matter from collecting on the spider arms or on the objects below the same. The casing 145 is completely closed with the exception of an aperture in its rear wall through which the work shaft 67 is adapted to extend into the interior of this casing.

When using the vertical shaft fixtures, spiral gears 149 are keyed upon each of the projecting ends of the work shafts 67 and these gears are retained upon the work shafts, as by collars 150. Each of the spiral gears 149 is adapted to mesh with a similar gear 151 fixed upon a vertical shaft 152. Vertical shaft 152 is rotatably mounted in anti-friction bearings 153 retained within the casing 145. Shaft 152 extends upwardly through the casing 145 and projects above this casing for receiving a work holder or an adapter 154 for holding the work 155.

Movable clutch elements 66 are urged toward their respective cooperating clutch elements 65 so as to interlock with these clutch elements by the action of compression springs 69. Clutch releasing levers 72 (Fig. 3) are pivotally mounted upon pins 73 carried by the arms 45 and are adapted to move the clutch elements 66 against the tension of spring 69 and out of engagement with clutch element 65 when these operating levers engage a cam 73 mounted upon the table 8 adjacent the strut 5. Cam 73 is adapted to engage each of the levers 72 successively as the spider 42 is rotated by an intermittent movement of Geneva wheel 34. Cam 73 is so positioned that it engages a lever 72 to move the cooperating clutch element 66 to disengaged position as the radiating arm 45 carrying the respective lever 72 comes to a stop or dwells adjacent the strut 5. This action of the cam 73 acts to stop the rotation of the respective work shaft 67 so that the machine operator positioned at strut 5 may remove finished work and apply new work to the work holders 70 as these holders come to rest at the strut 5.

Operating head pedestals 4 are formed with vertically spaced brackets 76 and 77

(see especially Figs. 5 to 8), which brackets have aligned interior circular slide bearing apertures for receiving hollow, cylindrical posts 78, illustrated as open at their upper ends and closed at their lower ends. Posts 78 are adapted to support grinding, polishing or buffing operating wheel heads and these posts are vertically adjustable with respect to the brackets 76 and 77. A threaded shaft 79 is vertically aligned with the central vertical axis of each of the posts 78 and is threaded through a vertical aperture provided in the lower end of the post. The lower portion of threaded shaft 79 projects into a gear housing 80 and has its lower end rotatably supported in a bearing 81 provided in this housing. A gear 82 is fixed upon shaft 79 within the housing 80. Gear 82 meshes with another gear 83 which is fixed upon the lower end of a vertical rod 84. Rod 84 extends exteriorly of housing 80 and through a vertical bearing provided in the bracket 77, and has a hand wheel 85 secured to its upper end.

The turning of hand wheel 85 causes gear 83 to revolve gear 82, thereby turning the threaded shaft 79 and causing the post 78 to move up or down through the slide bearing apertures provided in the brackets 76 and 77, the direction of movement of the post depending upon the direction in which the handle 85 is turned. Post 78 is provided with a vertical keyway 86 which cooperates with a set screw 87 threaded through bracket 77. Set screw 87 causes post 78 to travel in a truly vertical direction. Bracket 76 is split, and is adapted, after the post 78 has been adjusted to desired vertical position, to be clamped upon this post by tightening a hand screw 90, thereby preventing vibration or accidental movement of the post 78.

In Figs. 5 to 8 a post 78 is illustrated as supporting a polishing or buffing operating wheel head which is designated as a whole by the reference numeral 74. This operating wheel head comprises a fork member 88 which is formed with a recess or socket in its shank portion for receiving and conforming to the upper end of the post 78. Set screws 89 are threaded through the wall of the shank portion of fork member 88 and engage post 78 for locking the fork member in any desired angular portion about this post or with respect to the vertical axis of the same. A yoke member 92 is formed with a knuckle 93 which projects into the fork member 88. A shaft 94 extends through and is keyed to the knuckle 93. Shaft 94 is turnably mounted in bearings 95 in the fork member 88 and has reduced end portions 96 and 97 projecting beyond the sides of this fork member.

A worm wheel 98 is keyed upon the reduced end portion 96 and meshes with a worm 99 that is fixed upon a hand wheel shaft 100. Shaft 100 is supported in bearings formed on the fork member 88 and has a hand wheel 101 fixed on the overhanging end thereof. By turning hand wheel 101 the worm 99 is caused to revolve worm wheel 98 and shaft 100, thereby turning the yoke member 92. Yoke member 92 may thus be turned through any angle up to 180 degrees. In Fig. 1 the yoke member 92 is shown in a vertical position, whereas in Figs. 5 to 7 it is shown in a horizontal position.

A segmental plate 102 is keyed upon the reduced end portion 97 of shaft 94 and is provided with an arcuate slot 103. A screw 104 projects through slot 103 and is threaded into the fork member 88. By tightening screw 104 so that the same engages the segmental plate 102 and presses the latter against the side of the fork member 88, the shaft 94 is prevented from turning with respect to the fork member and the yoke member 92 is locked in fixed position and is prevented from vibrating.

The yoke member 92 is provided with a threaded aperture extending at right angles to the shaft 94 and offset therefrom for receiving a threaded rod 105. The end portions 106 and 107 of the rod 105 are not threaded and extend through bearings provided in a base 108 that carries a motor 109. The end portion 107 is of reduced diameter and has a collar 110 secured to its outer end, as by a set screw 111, which collar cooperates with the annular shoulder formed between the portion 107 and the threaded portion of the rod 105 to prevent endwise movement of this rod with respect to the base 108. The end portion 106 is provided with a squared end 112 for receiving a wrench. By turning the rod 105 by means of the squared end 112, the base 108 and hence the motor 109, may be shifted laterally with respect to the yoke member 92.

A pair of screw rods 113 and 114 are threaded through the yoke member 92 on opposite sides of the rod 105 and engage the base 108 for shifting this base angularly about the rod 105. Screw rod 113 engages the base 108 directly, whereas a coil compression spring 115 is interposed between the end of screw rod 114 and base 108 to permit of a slight yield or turning of the base 108 about the rod 105 in use. A set screw 142 is threaded through a boss provided on yoke member 92 and by pressing a shoe against threaded rod 105 serves to lock this rod in any desired position within the yoke member.

The shaft of motor 109 is connected in driving relation by means of pulleys 116 and 117 and driving belts 118 to an operating wheel spindle 120, which carries an operating wheel, such as a polishing or buffing wheel 121, as especially illustrated in Figs. 1 and 2. Operating wheel spindle 120 extends through and is rotatably mounted in bearings provided in a reciprocating gear casing 122 of the type disclosed in my copending application Serial Number 450,365, filed May 7, 1930. Suitable gearing within reciprocating gear casing 122 may be used when desired for giving the operating wheel spindle 120 a longitudinal vibratory motion of relatively small amplitude for the purpose of causing the operating wheel 121 to have a wiping motion over the work as the wheel revolves thereagainst. This wiping motion causes the action of the wheel to be much more rapid and produces a far better finish than if the wheel were in a fixed plane as the same revolves. Since, the reciprocating gear casing 122 is disclosed and claimed in the above identified copending application, the same appears to require no further description in this application.

In use, the polishing or buffing operating wheel 121 may be universally adjusted to any angular position desired to suit the work or objects worked on by suitably manipulating the operating head 74. By loosening hand wheel 90, the operating wheel 121 may be turned angularly about the post 78. By turning hand wheel 101 this operating wheel may be turned angularly about an axis lying within the plane of shaft 94 that extends at right angles to the axis of post 78. By adjusting threaded rod 105, the operating wheel may be shifted laterally with respect to yoke member 92, and by adjusting threaded rods 113 and 114, the operating wheel may be shifted angularly about threaded rod 105. The presence of the spring 115 enables the polishing or buffing wheel to yield to imperfections in the surface contour of the work 71 and thus prevent injury to the wheel.

In Figs. 1 and 2 and especially Fig. 9, a post 78 is illustrated supporting a grinding operating wheel head designated as a whole by the reference numeral 123. This post 78 shown in Fig. 1, instead of being vertically adjustable by means of a hand wheel, as hand wheel 85 shown in Fig. 5, is illustrated as vertically adjustable by means of a collar 125 which is secured to the threaded shaft 79. By turning collar 125, as by a spanner wrench, the post 78 may be raised or lowered.

Grinding operating wheel head 123 comprises a sub-base 124 turnably mounted upon the upper portion of post 78. Sub-base 124 has a central vertical recess extending upwardly from its under surface for receiving the upper portion of post 78. Sub-base 124 may be turned with respect to post 78 about the central vertical axis of this post and this sub-base may be secured in any desired angular position, as by screws 126. Sub-base 124 has an offset upwardly extending angular supporting portion 127 upon which the base of a motor 128 is adjustably mounted. A driving pulley 129 is keyed upon the armature shaft of motor 128 and drives a driven pulley 130 by means of a pair of transmission belts 131. The driven pulley 130 is fixed upon a reduced upper extension of an operating wheel spindle 132. Operating wheel spindle 132 extends downwardly through, and is supported by, spaced bearings 133 and 134 provided on a swivel bracket 135. The lower end portion of spindle 132 projects downwardly from bearing 134 and carries an operating wheel 136, illustrated as a grinding wheel. Operating wheel 136 may be adjusted up or down upon spindle 132 by nuts 137. Swivel bracket 135 is pivotally mounted on a bolt 138 that extends through an aperture provided in the supporting portion 127.

Oppositely arranged lugs 139 are secured, as by screws, to the supporting portion 127 adjacent the sides of the swivel bracket 135. Rods 140 are threaded through the lugs 139 and abut the sides of the bracket 135 below the bolt 138. By adjusting rods 140, the spindle 132 may be turned about the horizontal axis of bolt 138, thereby adjusting the operating wheel 136 angularly in a vertical plane. It will be noted that by loosening the screws 126 and adjusting the sub-base 124, the operating wheel 136 may be turned to any angular position about a vertical axis. Also, operating wheel 136 may be raised or lowered, as desired, by raising or lowering post 78. It will be noted, therefore, that operating wheel 136 may be adjusted up or down, or sideways, or may be turned angularly by means of rods 140 to adapt the same to the work. Operating wheel 136 is shown as of the ring type grinder wheel for operating upon the work 71.

In use, with the motor 13 running, the spider 42 is driven with an intermittent motion, the drive being by way of belt 14, counter-shaft 17, sprocket gearing 20, 21 and 22, worm 27, worm wheel 28, Geneva gearing 32, 33 and 34, hollow spindle 35 and the spider 42. The spider 42 moves in successive steps, each of said steps consisting of a fifth of a revolution of the spider. After each successive step, the spider comes to rest for a period or dwells for a time, depending upon the speed of motion of the Geneva gearing 32, 33 and 34. At times of dwell the work or objects 71 are positioned under the operating wheels 121 and 136. The work while under the operating wheels is revolved by the work shafts 67. The drive for the work shafts is by way of belt 14, counter-shaft 17, sprocket gearing 50, 51 and 52, worm 55, worm wheel 56, shaft 57, bevel gears 61 and 62, shafts 63, clutches 65—66 to the work shafts 67.

By changing the relative sizes of sprockets 20 and 22, the speed of the Geneva gearing may be varied and consequently the period of dwell of the spider 42 may be correspondingly varied. Likewise, by varying relative proportions of sprockets 50 and 51, the speed of rotation of the work shafts 67 may be varied so that any desired surface speed of the work 71 is obtained regardless of the proportions of the work. Preferably, the sprockets 20, 22 and 50, 51 are of the split type, so that they may be readily removed from their respective shafts and replaced by other sprockets of different sizes. By using interchangeable sprockets, the machine may be set up to give any desired period or dwell and any desired surface speed of the work.

The machine operator normally stands or is positioned substantially in front of the cam 73 during the operation of the machine. As each of the work holders dwells temporarily in front of the machine operator, the cam 73 serves to hold each respective clutch 65—66 in released position so that the work shaft 67 and the work holder 70 is stationary, thereby enabling the operator to remove the finished work from the holder and to replace new work thereon. If it be assumed that spider 42 rotates in a clockwise direction, as indicated by the arrow in Fig. 2, the work, after being assembled upon the work holder by the operator, moves to the first operating wheel 136. With the machine as set up in Fig. 2, this wheel is a grinding wheel and serves to grind the work as the same is rotated thereunder by the work shaft 67 during the period of dwell of the spider. From the first wheel 136, the work passes to the second wheel 136 and is further ground. From this second wheel, the work passes in succession to the two polishing wheels 121. When the work again reaches the operator, the operations on the work are complete and the same may be removed from the holder and new work placed thereon.

The machine as set up in Fig. 2, employs two grinders and two polishers, but it is to be understood that the operating wheel supporting heads are interchangeable and the machine may be readily set up with four grinding wheels, if desired, or with four polishing or buffing wheels, or with any combination of polishing wheels, grinding wheels or buffing wheels. The polishing or buffing wheel heads 74 are designed to permit the wheels 121 to give or yield slightly on omission, so that the same will conform to the work, whereas the grinding operating wheel heads 123 are designed to hold the wheels 136 absolutely rigid so that the same will produce a predetermined grinding effect.

When it is desired to revolve the work or objects about a vertical axis, as for the purpose of working upon a side of the object; vertical shaft fixtures are attached to the flattened surfaces 147 of the annular flange 46 as illustrated in Figs. 10 and 11. In Fig. 11 an operating wheel 156 (shown in dot and dash lines) such as a polishing, buffing or grinding wheel, is shown operating upon the side wall of the work 155. The operating wheel 156 may be held by wheel head 74, for example, when this wheel head is positioned as illustrated in Fig. 5 with the operating wheel spindle 120 extending vertically.

In some instances, it may be desirable to use the machine of this invention for polishing or otherwise working upon flat surfaces, in which case the rotary work shafts 67 are not used; the work being placed directly upon the annular seat 157 (see Fig. 13) provided on the top of annular flange 46 of the spider. In this case the work 158 is either mounted loosely upon seat 157 or may be secured thereto, as by screws, if desired. Operating wheels 159 such as polishing wheels, are shown engaging the flat upper surfaces of the work 158. When thus operating upon flat work, it is not necessary to have the spider or bed revolve with an intermittent motion, and consequently the Geneva gearing 32, 33 and 34 may be removed and replaced by ordinary spur gears 160 and 161 as shown in Fig. 12. Gears 160 and 161 will cause the spider or bed and consequently the work to revolve with a continuous motion, as will be apparent. Chain 52 may be disconnected so that the vertical shaft 57 is idle while the machine is being used for polishing or otherwise working upon the flat work.

It will be apparent that the Geneva gearing and the gears 160 and 161 may be diametrically split, if desired, to facilitate the rapid substitution of one of these drives for the other, as desired. In Fig. 13 a start and stop push button switch box 162 is illustrated as positioned on the machine in front of the operator for starting and stopping the motor 13.

It will be noted that the operating mechanism of the novel machine of this invention is completely housed so that dust or other foreign matter is excluded therefrom, thereby enabling the machine to be operated by unskilled labor. The great adaptability of the machine enables it to be used for grinding, polishing or buffing all types of work, and the machine does this work quickly owing to the use of a plurality of operating wheel heads which may be quickly adjusted to any position desired so as to conform to the work.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In a machine of the class described, in combination, a rotatable spider having a plurality of angularly spaced radially extending hollow arms, means for rotating said spider with an intermittent motion, rotatable work shafts mounted within the arms of said spider and having portions extending outwardly from said spider for supporting and rotating objects to be worked upon, means for rotating said work shafts, and universally mounted operating wheels positioned adjacent said spider in spaced relation from one another, said operating wheels having mountings provided for the ready adjustment of said wheels about any one of three axes extending at right angles to one another, whereby said wheels are disposed in the path of movement of the surfaces of the objects carried by said work shafts for working upon said objects, said spider rotating means operating to stop the rotating movement of said spider for a period of dwell as the objects carried by said shafts arrive in contact with said operating wheels so that the objects are held temporarily opposite said operating wheels while rotating in surface contact therewith.

2. In a machine of the class described, in combination, a casing having a top cover or table, a vertically extending hollow rotatable spindle contained within said casing and projecting upwardly through said table, a spider fixed upon the top portion of said spindle, said spider having a hollow central portion and hollow arms radiating outwardly from said central portion, a vertically extending rotatable shaft contained within said housing and projecting upwardly within said hollow spindle and into the central portion of said spider, radially extending shafting contained within said spider arms, said shafting having inner end portions projecting into the central portion of said spider and outer end portions projecting radially outwardly from said spider, gearing interconnecting said vertically extending shaft within said spider central portion to the inner end portions of said shafting for driving the latter from said vertical shaft, the outer end portions of said shafting being adapted to receive work holders for supporting and rotating objects to be worked upon, and driving means contained within said housing for driving said hollow spindle and said spider carried thereby with an intermittent rotary motion, said driving means also serving to drive said vertical shaft with a rotary motion whereby said radial shafting is caused to rotate the work holders and objects carried thereby.

3. In a machine of the class described, in combination, a casing having a top cover or table, a vertically extending hollow rotatable spindle contained within said casing and projecting upwardly through said table, a horizontally disposed spider fixed upon the top portion of said spindle over said table and adjustable angularly with respect to said spindle, said spider having a hollow central portion and hollow arms radiating outwardly from said central portion, a vertically extending rotatable shaft contained within said housing and projecting upwardly within said hollow spindle and into the central portion of said spider, radially extending shafting contained within said spider arms, said shafting having inner end portions projecting into the central portion of said spider and outer end portions projecting radially outwardly from said spider, gearing interconnecting said vertically extending shaft within said spider central portion to the inner end portions of said shafting for driving the latter from said vertical shaft, the outer end portions of said shafting being adapted to receive work holders for supporting and rotating objects to be worked upon, driving means contained within said housing for driving said hollow spindle and said spider carried thereby with an intermittent rotary motion, said driving means also serving to drive said vertical shaft with a rotary motion whereby said radial shafting is caused to rotate the work holders and objects carried thereby, standards disposed about the sides of said casing, and operating heads universally mounted upon said standards, said operating heads having operating wheels arranged to engage and work upon the objects rotated by said radial shafting, the motion of said spider being such as to cause the objects carried by said shafting to engage each of said operating wheels in succession, said spider dwelling for awhile as an object engages each of said operating wheels, so that each wheel will have time to complete its operation on the object.

4. In a machine of the class described, in combination, a casing having a top cover or table, a vertically extending hollow rotatable spindle contained within said casing and projecting upwardly through said table, a spider fixed upon the top portion of said spindle, said spider having a hollow central portion and hollow arms radiating outwardly from said central portion, a vertically extending rotatable shaft contained within said housing and projecting upwardly within said hollow spindle and into the central portion of said spider, radially extending shafting contained within said spider arms, said shafting having inner end portions projecting into the central portion of said spider and outer end portions projecting radially outwardly from said spider, gearing interconnecting said vertically extending shaft within said spider central portion to the inner end portions of said shafting for driving the latter from said vertical shaft, the outer end portions of said shafting being adapted to receive work holders for supporting and rotating objects to be worked upon, a counter-shaft contained within said casing, a motor contained within said casing and connected in driving relation with said counter-shaft, intermittent gearing interposed between said counter-shaft and said hollow spindle for driving the latter and said spider from said counter-shaft with an intermittent motion, and additional gearing interposed between said counter-shaft and said vertical shaft for driving the latter from said counter-shaft to effect rotation of said radial shafting.

5. In a machine of the class described, in combination, a casing having a top cover or table, a vertically extending hollow rotatable spindle contained within said casing and projecting upwardly through said table, a horizontally disposed spider fixed upon the top portion of said spindle over said table, said spider having a hollow central portion and hollow arms radiating outwardly from said central portion, a vertically extending rotatable shaft contained within said housing and projecting upwardly within said hollow spindle and into the central portion of said spider, radially extending shafting contained within said spider arms, said shafting having inner end portions projecting into the central portion of said spider and outer end portions projecting radially outwardly from said spider, gearing interconnecting said vertically extending shaft within said spider central portion to the inner end portions of said shafting for driving the latter from said vertical shaft, the outer end portions of said shafting being adapted to receive work holders for supporting and rotating objects to be worked upon, a counter-shaft contained within said casing, a motor contained within said casing and connected in driving relation with said counter-shaft, intermittent gearing interposed between said counter-shaft and said hollow spindle for driving the latter and said spider from said counter-shaft with an intermittent motion, and additional gearing interposed between said counter-shaft and said vertical shaft for driving the latter from said counter-shaft to effect rotation of said radial shafting, and means for varying the ratio of said intermittent gearing and said additional gearing, to thereby vary the period of dwell of said spider and the speed of rotation of said radial shafting at will.

6. In a machine of the class described, a substantially cylindrical casing having a base, cylindrical side walls and a top or table, angularly spaced standards disposed about the side walls of said casing, said standards having spaced brackets formed thereon, vertical posts slidably mounted in said brackets, means for moving said posts vertically with respect to said brackets, operating wheel heads universally mounted on top of said posts, said operating wheel heads having motor driven operating wheels, a cam mounted on said table intermediate two of said operating wheels, a horizontally disposed spider positioned above said table and rotatable about a vertical axis coinciding with the center of said table, said spider having spaced, radially extending arms, means within said casing for rotating said spider with an intermittent motion so that each of said arms moves from said cam to each of said operating wheels in succession during a complete revolution of said spider, said operating arms dwelling for a time opposite said cam and opposite each of said operating wheels, rotatable work shafts carried by said operating arms, means for rotating said work shafts, said work shafts being arranged to carry work for contacting with said operating wheels, and clutches interposed between said work shafts and the means for rotating said shafts, said clutches having operating levers disposed in the path of said cam, whereby as each of said spider arms dwells temporarily opposite said cam, the latter actuates said operating lever to disconnect the drive to the work shaft carried by such radial arm, thereby causing the work shaft to come to rest and enabling the old work to be removed from the shaft and new work to be applied thereto.

7. In a machine of the class described, in combination, a spider rotatable with intermittent motion, an operating wheel, and a mounting for said wheel constructed and arranged to enable the universal adjustment thereof with respect to said spider and about a plurality of spaced axes extending at right angles to one another, said mounting having a yielding spring device to hold said wheel yieldingly in contact with work carried by said spider.

8. In a machine of the class described, a casing, a member mounted thereon and arranged to be rotated with an intermittent motion, a standard disposed at the side of said casing, a vertical post carried by said standard, a fork member mounted on top of said post, a yoke member having a knuckle pivotally connected to said fork member, manually operable means for adjusting said yoke member to any desired position about its pivotal connection with said fork member, and an operating wheel head pivotally mounted on said yoke member, screw rods threaded through said yoke member and engaging said operating wheel head for holding said operating wheel head in selected fixed position with respect to said yoke member, said operating wheel head having an operating wheel for contacting with work carried by said intermittently rotatable member.

9. In a machine of the class described, a casing, a member mounted thereon and arranged to be rotated with an intermittent motion about a vertical axis, a standard disposed at the side of said casing, a vertical post carried by said standard and adapted to be adjusted vertically with respect to said standard, a fork member mounted on top of said post and arranged to be secured to said post in any desired angular position with respect to the axis of said post, a yoke member having a knuckle pivotally connected to said fork member whereby said yoke member may be turned about a horizontal axis, manually operable means for adjusting said yoke member to any desired position about its pivotal connection with said fork member, and an operable wheel head pivotally mounted on said yoke member, means for adjusting said operating wheel head transversely with respect to said yoke member, screw rods threaded through said yoke member and engaging said operating wheel head for holding said operating wheel head in desired selected position with respect to said yoke member, said operating wheel head having an operating wheel for contacting with work carried by said intermittently rotatable member.

10. In a machine of the class described, a casing, a member mounted thereon and arranged to be rotated with an intermittent motion, a standard disposed at the side of said casing, a vertical post carried by said standard, a fork member mounted on top of said post, a yoke member having a knuckle pivotally connected to said fork member, manually operable means for adjusting said yoke member to any desired position about its pivotal connection with said fork member, and an operating wheel head pivotally mounted on said yoke member, screw rods threaded through said yoke member and engaging said operating wheel head for holding said operating wheel head in desired selected position with respect to said yoke member, said operating wheel head having an operating wheel for contacting with work carried by said intermittently rotatable member, and a spring interposed between one of said threaded rods and said operating wheel head to yieldingly hold said operating wheel in contact with work carried by said member.

11. In a machine of the class described, a casing, a rotatable spider or bed mounted on top of said casing, means contained within said casing for rotating said spider or bed, rotatable work shafts carried by said spider or bed and projecting horizontally therefrom, means within said casing and said spider or bed for rotating said work shafts, and vertical shaft fixtures removably attached to said spider or bed, said vertical shaft fixtures having vertical work carrying shafts adapted to be geared to said work shafts, whereby work carried by said vertical shafts is rotated about vertical axes.

12. In a machine of the class described, a casing, a rotatable spider or bed mounted on top of said casing, means contained within said casing for rotating said spider or bed, rotatable work shafts carried by said spider or bed and projecting horizontally therefrom, means within said casing and said spider or bed for rotating said work shafts, standards at the sides of said casing and forming a part thereof, and operating wheel heads adjustably mounted on said standards and carrying operating wheels for working upon work carried by said spider or bed and rotated from said work shafts, clutches respectively connected in said respective work shafts, and cam means positioned on said casing intermediate two of said operating wheels for disengaging said clutches in succession as said spider revolves, said cam means serving, upon disengaging one of said clutches, to stop the rotation of the work carried by the corresponding work shaft, while others of said work shafts are rotating work against said operating wheels.

13. In a machine of the kind described, a horizontally disposed bed arranged to be rotated about a vertical axis, radiating rotatable shafting carried by said bed and housed within said bed, said shafting having end portions projecting radially exteriorly of said bed, means for rotating said bed and said shafting, fixtures removably attached to said bed, said fixtures having vertical work carrying shafts arranged to be driven from said shafting end portions, and operating means adjustably positioned exteriorly of said bed and adjacent the path of movement of said vertical work shafts for operating upon work carried by said vertical shafts.

In testimony, that I claim the invention set forth above I have hereunto set my hand this 30th day of December, 1930.

CARL B. LARSON.